United States Patent [19]

Passarella et al.

[11] Patent Number: 5,429,075
[45] Date of Patent: Jul. 4, 1995

[54] PET LEASH AND FLASHLIGHT COMBINATION APPARATUS

[76] Inventors: Frank A. Passarella; Dawn E. Vicale, both of 15680 SW. 106th La., Apt. 803, Miami, Fla. 33196

[21] Appl. No.: 193,947

[22] Filed: Feb. 9, 1994

[51] Int. Cl.⁶ .............................................. A01K 27/00
[52] U.S. Cl. .................................... 119/795; 224/251
[58] Field of Search ............. 119/769, 792, 795, 797, 119/858, 859; 224/226, 251

[56] References Cited

U.S. PATENT DOCUMENTS

| 1,007,515 | 10/1911 | Batchelder | 224/226 |
| 3,970,228 | 7/1976 | Keller | 224/251 |
| 4,911,347 | 3/1990 | Wilhite | 224/251 X |

FOREIGN PATENT DOCUMENTS

| 2904289 | 8/1980 | Germany | 119/858 |
| 505826 | 5/1939 | United Kingdom | 119/858 |

Primary Examiner—Robert P. Swiatek
Attorney, Agent, or Firm—R. J. Van Der Wall

[57] ABSTRACT

A combination leash apparatus for controlling the movements of an animal and retaining a flashlight includes a flexible elongate member having a first end and a second end, and a collar engagement structure at the first end and a handle portion at the second end; and a tubular retaining member attached to the elongate member for removably retaining a flashlight. The apparatus preferably additionally includes a supplemental compartment secured to the tubular retaining sleeve for retaining personal items. The elongate member preferably additionally includes a flat, flexible strap member. The collar engagement structure preferably includes a resiliently urged clasp assembly. The handle portion preferably includes a loop formed of the second end of the elongate member doubled back against and fastened to the elongate member. The tubular retaining member preferably includes a closed end having an end wall and an open end for receiving the flashlight. The tubular retaining member preferably additionally includes a switch port located to register with and provide access to a slide switch on a flashlight. The apparatus also preferably includes a hook and loop fastener for removably attaching the tubular retaining member to the elongate member. The tubular retaining member is preferably attached to the elongate member at the handle portion. The compartment includes an access opening. The access slit is preferably closed with a fastener. The compartment may be secured to the tubular retaining member.

17 Claims, 2 Drawing Sheets

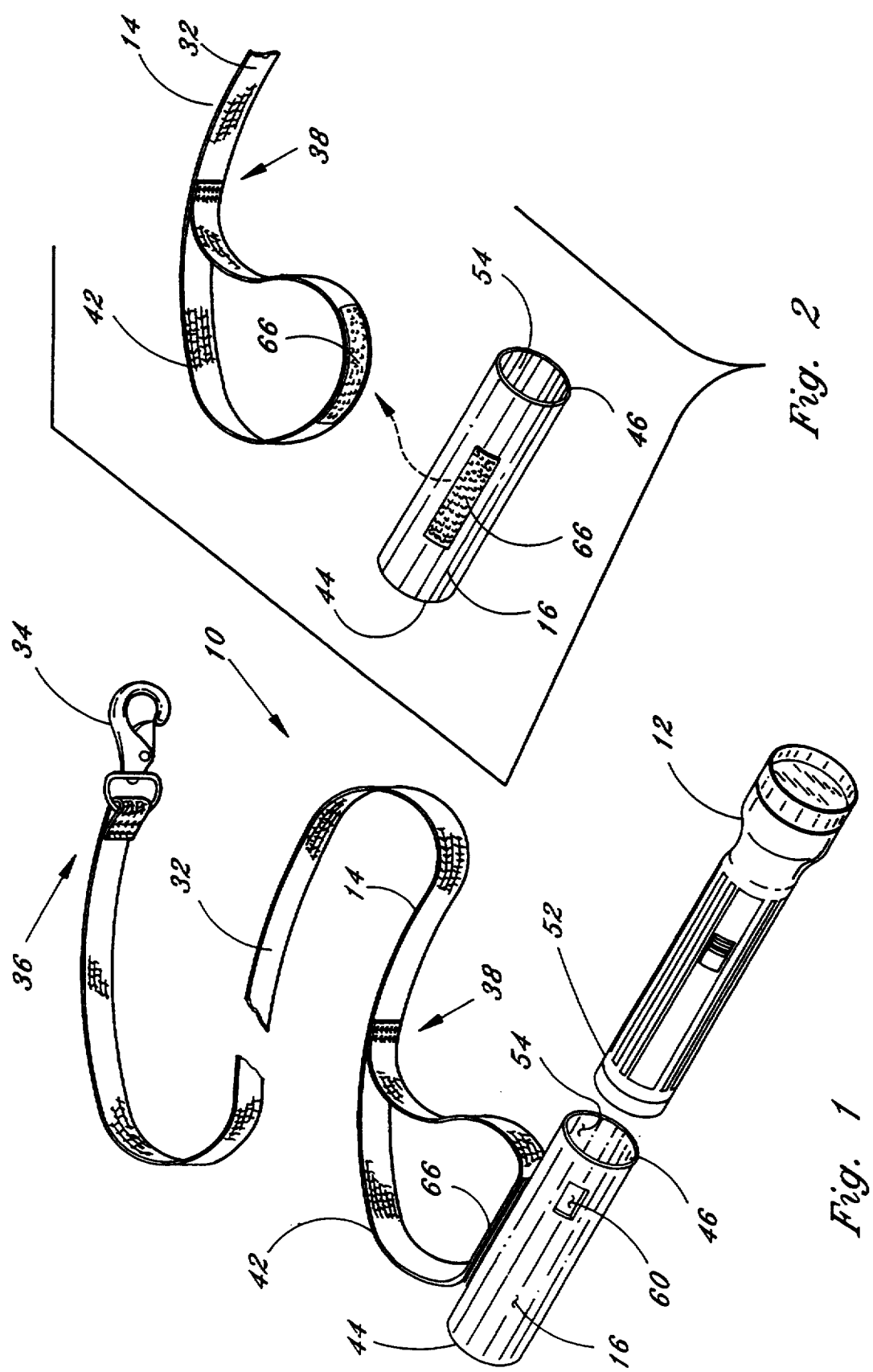

PET LEASH AND FLASHLIGHT COMBINATION APPARATUS

BACKGROUND OF THE INVENTION

1. Field of the Invention

The present invention relates generally to the field of leashes for pets. More specifically, it relates to a leash combination apparatus including a conventional leash, preferably in the form of a flat, flexible strap having a clasp assembly at a first end for engaging a pet collar and a handle portion at a second end. The handle portion is formed by looping back and fastening the second end to the strap. A tubular retaining sleeve is attached to the handle portion, is closed at one end and open at the other end, and is diametrically sized to snugly receive the shank portion of a flashlight. The flashlight is removably retained within the sleeve by friction with the sleeve inner surface. The sleeve may be formed of a heavy cloth fabric or plastic sheeting. The sleeve has a switch port located and sized to register with and expose a slide switch on the side of the flashlight to provide access to the switch while the flashlight is retained within the sleeve. The sleeve is either permanently attached to the handle portion with stitches or removably attached with hook and loop fasteners. A supplemental compartment is optionally attached to the closed end of the retaining sleeve. The compartment is formed of flexible material similar to that of the sleeve, having a substantially cylindrical shape with a lateral access slit closed with a fastener such as a zipper. The compartment is either permanently attached to the sleeve with stitches or removably attached with look and loop fasteners. Safety items such as mace or a stun gun, or such personal items as car keys, may be retained in the compartment.

2. Description of the Prior Art

There have long been leashes for controlling and holding pets while walking them. A problem has been that these leashes occupy at least one hand of a user so that other items which can be useful or necessary cannot easily be carried. Some safety items such as a flashlight and defensive items such as a mace canister may therefore be left behind. One may stray into an unfamiliar area with poor lighting while walking a pet. One may be more vulnerable to crime while out walking a pet, because one is typically outside his or her yard and on foot in a public place. When not walking a pet, one is more likely to remain safely within his or her own yard, or to be safely traveling in a car. Therefore, it is while one is walking a pet that certain items are apt to be most urgently needed and yet not at hand.

It is thus an object of the present invention to provide a leash apparatus which combines the pet control means of a leash with means for retaining items particularly needed when out walking a pet.

It is another object of the present invention to provide such an apparatus which is specifically suited to retaining a flashlight.

It is still another object of the present invention to provide such an apparatus which provides fast and easy access to these items for maximized safety and convenience.

It is finally an object of the present invention to provide such an apparatus which is simple and reliable in construction and inexpensive to manufacture.

SUMMARY OF THE INVENTION

The present invention accomplishes the above-stated objectives, as well as others, as may be determined by a fair reading and interpretation of the entire specification.

A combination leash apparatus for controlling the movements of an animal and retaining a flashlight, including a flexible elongate member having a first end and a second end, and a collar engagement structure at the first end and a handle portion at the second end; and a tubular retaining member attached to the elongate member for removably retaining a flashlight. The apparatus preferably additionally includes a supplemental compartment secured to the tubular retaining member for retaining personal items. The elongate member preferably additionally includes a flat, flexible strap member. The collar engagement structure preferably includes a resiliently urged clasp assembly. The handle portion preferably includes a loop formed of the second end of the elongate member doubled back against and fastened to the elongate member. The tubular retaining member preferably includes a closed end having an end wall and an open end for receiving the flashlight. Where the flashlight has a shank portion, the tubular retaining member is preferably formed of flexible material and is preferably diametrically sized to snugly receive and removably retain the flashlight shank portion through the action of friction between the tubular retaining member and the flashlight shank portion. The tubular retaining member preferably additionally includes a switch port located to register with and provide access to a slide switch on a flashlight. The apparatus also preferably includes a hook and loop fastener for removably attaching the tubular retaining member to the elongate member. The apparatus alternatively includes a fastener for permanently attaching the tubular retaining member to the elongate member. The tubular retaining member is preferably attached to the elongate member at the handle portion. The compartment includes an access opening. The access slit is preferably closed with a fastener. The compartment may be secured to the tubular retaining member.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective view of the inventive combination leash apparatus showing the flashlight withdrawn from the retaining sleeve.

FIG. 2 is a broken-away, partial view of the combination leash apparatus showing the retaining sleeve separated from the strap and showing mating hook and loop fastener patches on the strap handle portion and on the sleeve outer surface for removably attaching the sleeve.

DETAILED DESCRIPTION OF THE PREFERRED EMBODIMENTS

Figure 3:
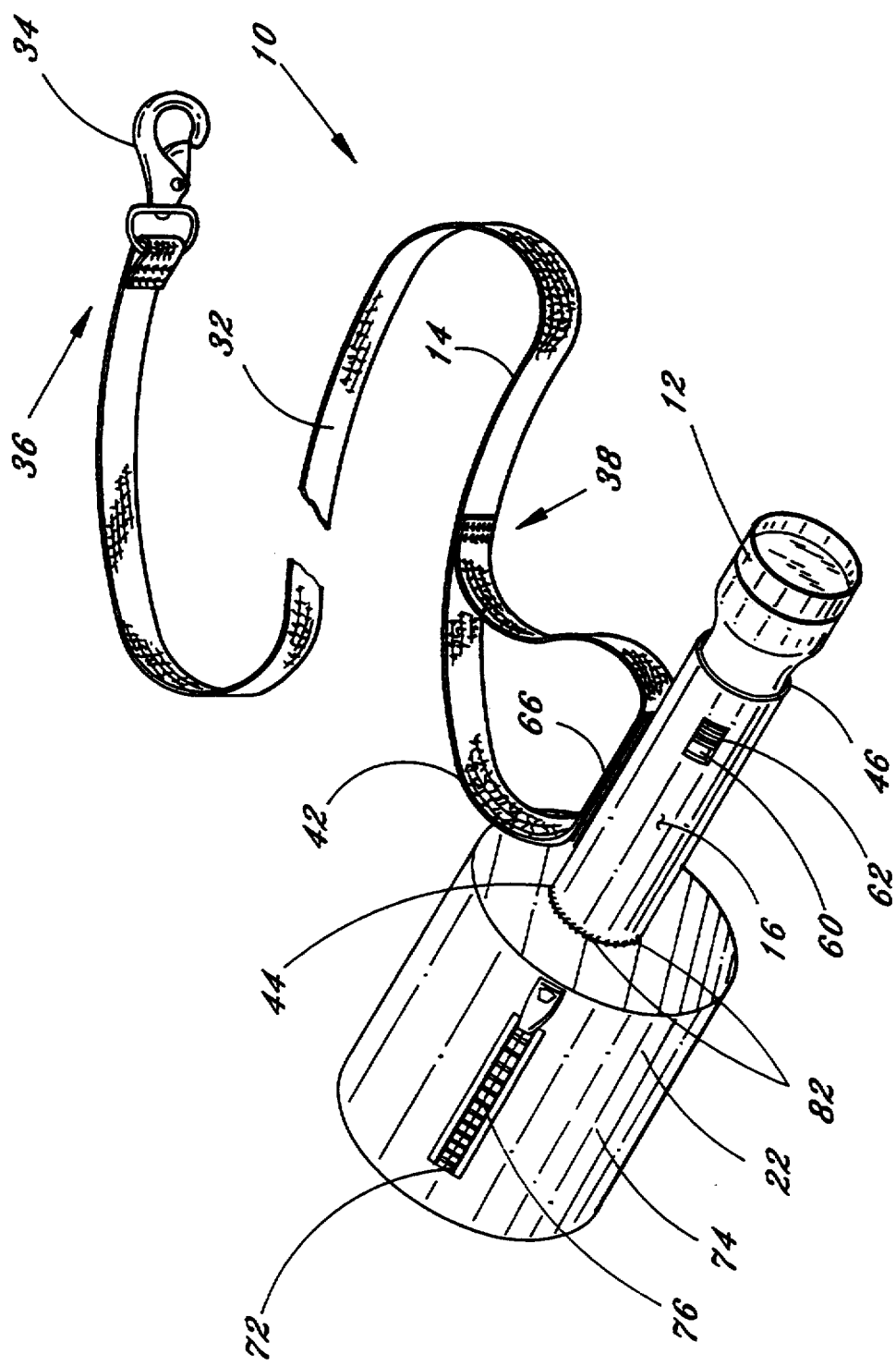
FIG. 3 is a perspective view of the inventive combination leash apparatus having the optional supplemental compartment, with the flashlight inserted into the retaining sleeve so that the flashlight slide switch registers with the switch port in the sleeve.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Referring to FIGS. 1–3, an item retaining leash apparatus 10 is disclosed for conveniently retaining a flashlight 12 and for optionally retaining additional useful items. Apparatus 10 includes a conventional leash 14 and a tubular retaining sleeve 16 attached to leash 14 for removably retaining a flashlight 12. A supplemental compartment 22 is optionally provided for retaining various items which are potentially useful on a walk such as a mace canister, some other defensive item, or a set of keys. Compartment 22 is either attached to retaining sleeve 16 or attached to leash 14.

Leash 14 preferably takes the form of a flat, flexible strap 32 having a clasp assembly 34 at its end 36 for engaging a pet collar. See FIG. 1. Leash 14 has at the other end 38 a handle portion 42, preferably formed by doubling end 38 of strap 32 back against strap 32 and fastening end 38 to strap 32. The reason leash 14 preferably includes a flat strap 32 is that a broad face is provided on either side of a strap to which an item can be securely fastened, as will be explained more fully below.

Retaining sleeve 16 is preferably closed at one end 44, and open at its other end 46 to receive a flashlight 12 shank portion 52. Sleeve 16 is diametrically sized to snugly receive flashlight shank portion 52, flashlight 12 being removably retained within sleeve 16 by friction with the sleeve 16 inner surface 54. Sleeve 16 is preferably formed of an elastic cloth fabric or plastic sheeting and has a switch port 60 positioned to register with and expose a slide switch 62 on flashlight 12 within sleeve 16. As a result, flashlight 12 can be operated while retained within sleeve 16. Sleeve 16 is either permanently attached to handle portion 42 with sewn stitches or is removably attached with hook and loop fasteners 66. See FIG. 2.

Compartment 22 is preferably formed of a flexible material similar to that of sleeve 16, and has a substantially cylindrical shape. See FIG. 3. A lateral access slit 72 is provided in a side wall 74 of compartment 22 through which items are inserted and withdrawn. Slit 72 is preferably secured with a fastener such as a zipper 76. Compartment 22 is either permanently attached to sleeve 16 with sewn stitches 82 or is removably attached with hook and loop fasteners. Supplemental compartment 22 serves to retain such safety items as a mace canister or a stun gun, or such useful personal items as car or house keys.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A combination leash apparatus for controlling the movements of an animal and retaining a flashlight, comprising:
   a flexible elongate member having a first end and a second end, and collar engagement means at said first end and a handle portion at said second end; and
   a tubular retaining member attached to said elongate member for removably retaining a flashlight and having a switch port located to register with and provide access to a slide switch on a flashlight.

2. The apparatus of claim 1, wherein said elongate member additionally comprises:
   a flat, flexible strap member.

3. The apparatus of claim 1, wherein said collar engagement means comprises:
   a resiliently urged clasp assembly.

4. The apparatus of claim 1, wherein said handle portion comprises a loop formed of said second end of said elongate member doubled back against and fastened to said elongate member.

5. The apparatus of claim 1, wherein said tubular retaining member comprises a closed end having an end wall and an open end for receiving a flashlight.

6. The apparatus of claim 1, wherein said tubular retaining member is formed of flexible material and is diametrically sized to snugly receive and removably retain a shank portion of a flashlight through the action of friction between said tubular retaining member and said flashlight shank portion.

7. The apparatus of claim 1, additionally comprising:
   hook and loop fastener means for removably attaching said tubular retaining member to said elongate member.

8. The apparatus of claim 1, additionally comprising:
   fastener means for permanently attaching said tubular retaining member to said elongate member.

9. The apparatus of claim 1, wherein said tubular retaining member is attached to said elongate member at said handle portion.

10. A combination leash apparatus for controlling the movements of an animal and retaining a flashlight, comprising:
    a flexible elongate member having a first end and a second end, and collar engagement means at said first end and a handle portion at said second end; and
    a tubular retaining member removably attached using hook and loop fastener means to said elongate member, said tubular retaining member for removably retaining a flashlight.

11. The apparatus of claim 10, wherein said elongate member additionally comprises:
    a flat, flexible strap member.

12. The apparatus of claim 10, wherein said collar engagement means comprises:
    a resiliently urged clasp assembly.

13. The apparatus of claim 10, wherein said handle portion comprises a loop formed of said second end of said elongate member doubled back against and fastened to said elongate member.

14. The apparatus of claim 10, wherein said tubular retaining member comprises a closed end having an end wall and an open end for receiving a flashlight.

15. The apparatus of claim 10, wherein said tubular retaining member is formed of flexible material and is diametrically sized to snugly receive and removably retain a flashlight shank portion through the action of friction between said tubular retaining member and said flashlight shank portion.

16. The apparatus of claim 10, wherein said tubular retaining member additionally comprises:

a switch port located to register with and provide access to a slide switch on a flashlight.

17. The apparatus of claim 10, wherein said tubular retaining member is attached to said elongate member at said handle portion.

* * * * *